(12) United States Patent
Hsieh

(10) Patent No.: US 11,687,123 B2
(45) Date of Patent: Jun. 27, 2023

(54) ROTATION SHAFT ASSEMBLY AND ELECTRONIC APPARATUS

(71) Applicant: Lenovo (Beijing) Limited, Beijing (CN)

(72) Inventor: Sungyu Hsieh, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 92 days.

(21) Appl. No.: 17/474,924

(22) Filed: Sep. 14, 2021

(65) Prior Publication Data

US 2022/0206542 A1  Jun. 30, 2022

(30) Foreign Application Priority Data

Dec. 30, 2020 (CN) .......................... 202011642663.5

(51) Int. Cl.
| | |
|---|---|
| *G06F 1/16* | (2006.01) |
| *F16C 11/10* | (2006.01) |
| *E05F 1/12* | (2006.01) |
| *E05D 3/12* | (2006.01) |

(52) U.S. Cl.
CPC ............ *G06F 1/1679* (2013.01); *F16C 11/10* (2013.01); *E05D 3/122* (2013.01); *E05F 1/12* (2013.01); *E05Y 2900/606* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,846,536 A | * | 7/1989 | Saitou ................ | G06F 1/1616 361/679.06 |
| 6,813,813 B2 | * | 11/2004 | Lu ....................... | G06F 1/1616 16/334 |
| 6,918,159 B2 | * | 7/2005 | Choi ................... | G06F 1/1681 16/337 |
| 6,988,294 B2 | * | 1/2006 | Birtley ................ | G06F 1/1616 16/337 |
| 7,447,006 B2 | * | 11/2008 | Kang ................... | F16M 13/02 361/679.55 |
| 8,020,826 B2 | * | 9/2011 | Zhou .................. | F16M 11/2021 248/917 |
| 8,051,537 B2 | * | 11/2011 | Wang .................. | E05D 11/087 16/330 |
| 8,069,534 B2 | * | 12/2011 | Wang .................. | G06F 1/1681 16/374 |
| 8,261,412 B1 | * | 9/2012 | Lin ..................... | G06F 1/1681 16/374 |

(Continued)

*Primary Examiner* — Lisa Lea-Edmonds
(74) *Attorney, Agent, or Firm* — Anova Law Group, PLLC

(57) ABSTRACT

A rotation shaft assembly includes a first lock accessory, a second lock accessory, a rotation shaft, a driven member, and a torsion mechanism. The rotation shaft includes a first member and a second member that are rotatable relative to each other, where the first member is fixedly connected to the first lock accessory, and the second member is fixedly connected to the second lock accessory. The driven member is connected to the first member or the second member, and is configured to be driven to rotate by the first member or the second member. The torsion mechanism is at least provided at the driven member and is configured to provide torsion during rotation.

20 Claims, 9 Drawing Sheets

(56) References Cited

U.S. PATENT DOCUMENTS

| | | | | |
|---|---|---|---|---|
| 8,621,716 B2* | 1/2014 | Chen | ................... | G06F 1/1681 |
| | | | | 361/679.55 |
| 9,009,919 B1* | 4/2015 | Chiang | ................ | G06F 1/1681 |
| | | | | 16/303 |
| 9,201,464 B2* | 12/2015 | Uchiyama | ............. | G06F 1/1618 |
| 9,429,986 B2* | 8/2016 | Xia | ........................ | G06F 1/162 |
| 11,142,932 B2* | 10/2021 | Hsu | ........................ | E05D 3/122 |
| 11,231,754 B2* | 1/2022 | Kang | ....................... | E05D 3/122 |
| 11,382,228 B2* | 7/2022 | Chen | ................... | H05K 5/0226 |
| 11,573,610 B2* | 2/2023 | Hsu | ....................... | G06F 1/1681 |
| 2006/0050867 A1* | 3/2006 | Kawamoto | ......... | H04M 1/0218 |
| | | | | 379/433.13 |
| 2015/0342068 A1* | 11/2015 | Su | ....................... | H04M 1/022 |
| | | | | 16/354 |
| 2017/0147035 A1* | 5/2017 | Han | ...................... | G06F 1/1681 |
| 2017/0235337 A1* | 8/2017 | Vic | ........................ | E05D 11/00 |
| | | | | 361/679.55 |
| 2022/0206542 A1* | 6/2022 | Hsieh | ................. | G06F 1/1679 |
| 2022/0397943 A1* | 12/2022 | Hsiang | ................ | G06F 1/1681 |

* cited by examiner

ROTATION SHAFT ASSEMBLY AND ELECTRONIC APPARATUS

CROSS-REFERENCE TO RELATED APPLICATION

This application claim priority to Chinese Patent Application No. 202011642663.5, filed Dec. 30, 2020, the entire content of which is incorporated herein by reference.

TECHNICAL FIELD

The present disclosure relates to the technical field of rotation shaft and, more particularly, to a rotation shaft assembly and an electronic apparatus.

BACKGROUND

With the development of technology, notebook computers have become thinner and lighter, and thickness of a display screen has also been reduced accordingly. In order to enable the display screen to be rotatably connected to a keyboard end, a rotation shaft needs to be set to connect the display screen and the keyboard end. A common design in existing technology is: a rotation shaft is set to connect the keyboard end and the display screen, and meanwhile, the rotation shaft can make the display screen be fixed at any position. When a user turns the rotation shaft to any position, the rotation shaft can provide resistance to prevent the rotation shaft from continuing to rotate under an action of inertia or gravity. Since the resistance provided by the rotation shaft is related to its diameter, the larger the diameter of the rotation shaft, the greater the resistance can be provided. Therefore, in the existing technology, in order to ensure normal use of the notebook computer, the diameter of the rotation shaft is usually set to be relatively large, which is larger than the thickness of the display screen, so that thickness at a position of the rotation shaft of the notebook computer is relatively large.

SUMMARY

In accordance with the disclosure, there is provided a rotation shaft assembly including a first lock accessory, a second lock accessory, a rotation shaft, a driven member, and a torsion mechanism. The rotation shaft includes a first member and a second member that are rotatable relative to each other, where the first member is fixedly connected to the first lock accessory, and the second member is fixedly connected to the second lock accessory. The driven member is connected to the first member or the second member, and is configured to be driven to rotate by the first member or the second member. The torsion mechanism is at least provided at the driven member and is configured to provide torsion during rotation.

Also in accordance with the disclosure, there is provided an electronic apparatus including a first body, a second body, and a rotation shaft assembly. The rotation shaft assembly includes a first lock accessory connected to the first body, a second lock accessory connected to the second body, a rotation shaft, a driven member, and a torsion mechanism. The rotation shaft includes a first member and a second member that are rotatable relative to each other, where the first member is fixedly connected to the first lock accessory, and the second member is fixedly connected to the second lock accessory. The driven member is connected to the first member or the second member, and is configured to be driven to rotate by the first member or the second member. The torsion mechanism is at least provided at the driven member and is configured to provide torsion during rotation.

BRIEF DESCRIPTION OF THE DRAWINGS

The objectives, features, and advantages of the exemplary embodiments of the present disclosure will become easier to understand through the following detailed description with reference to the accompanying drawings. In the drawings, some embodiments of the present disclosure are shown in an exemplary but not restrictive manner, and the same or corresponding reference numerals represent the same or corresponding parts.

REFERENCE NUMERALS

Figure 1:
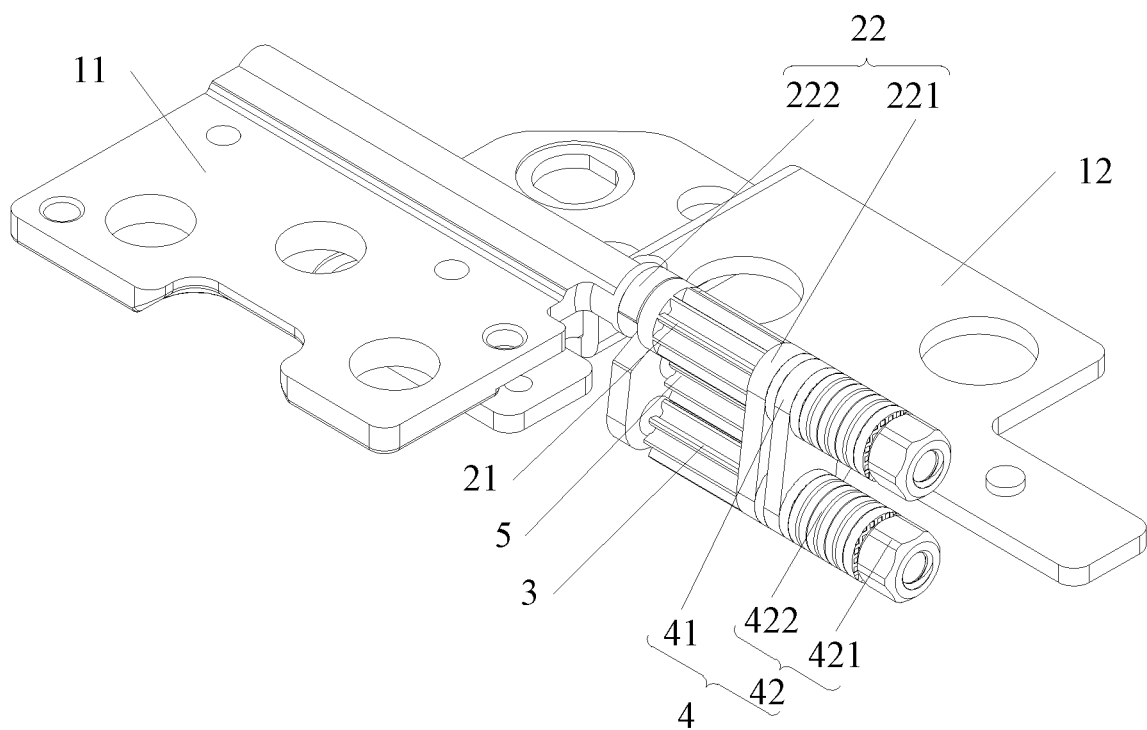
FIG. 1 is a schematic structural diagram of a rotation shaft assembly according to an embodiment of the present disclosure.

First lock accessory 11, Second lock accessory 12, Rotation shaft 2, First member 21, Second member 22, First bracket 221, Support member 2211, Connection member 2212, Second bracket 222, Limiting hole 2221, Driven member 3, Torsion mechanism 4, Fixation member 41, First oil storage tank 411, Follower member 42, Lock member 421, Elastic member 422, Elastic washer 4221, First wear-resistant washer 43, Second wear-resistant washer 44, First torsion mechanism 401, Second torsion mechanism 402, First transmission member 5.

DETAILED DESCRIPTION OF THE EMBODIMENTS

Hereinafter, exemplary embodiments of the present disclosure will be described in more detail with reference to the accompanying drawings. Although the drawings show exemplary embodiments of the present disclosure, it should be understood that the present disclosure can be implemented in various forms and should not be limited by the embodiments described herein. On the contrary, these embodiments are provided to enable a more thorough understanding of the present disclosure and to fully convey the scope of the present disclosure to those skilled in the art.

It should be noted that, unless otherwise specified, the technical or scientific terms used herein have the usual meaning understood by those skilled in the art to which the present disclosure belongs.

The present disclosure provides a rotation shaft assembly. As shown in FIGS. 1-9, the rotation shaft assembly includes: a first lock accessary 11, a second lock accessary 12, a rotation shaft 2, a driven member 3, and a torsion mechanism 4. The rotation shaft 2 includes a first member 21 and a second member 22 that rotate relative to each other. The first member 21 is fixedly connected to the first lock accessary 11, and the second member 22 is fixedly connected to the second lock accessary 12. The driven member 3 is connected to the first member 21 or the second member 22, and rotation of the first member 21 or the second member 22 drives the driven member 3 to rotate. The torsion mechanism 4 is at least provided at the driven member 3 and is configured to provide torsion during rotation.

The first lock accessary 11 in the rotation shaft assembly can be connected to a first body of an electronic apparatus, and the second lock accessary 12 can be connected to a second body of the electronic apparatus. The first body and the second body of the electronic apparatus are rotatably connected by the rotation shaft assembly, and any angle can be formed between the first body and the second body through rotation. The rotation shaft 2 includes the first member 21 and the second member 22 that can rotate relative to each other, where the first member 21 is fixedly connected to the first lock accessory 11, and the second member 22 is fixedly connected to the second lock accessory 12, so that the first lock accessory 11 and the second lock accessory 12 rotate relative to each other through the rotation shaft 2. The first member 21 and the second member 22 can be sleeved, that is, one of the first member 21 and the second member 22 is provided with a first movable hole, and the other one is movably arranged in the first movable hole, so that the other one of the first member 21 and the second member 22 can rotate in the first movable hole. In addition, a predetermined angle can be formed between the first member 21 and the second member 22 through rotation. The driven member 3 is connected to the first member 21 or the second member 22, and the rotation of the first member 21 or the second member 22 can drive the driven member 3 to rotate accordingly. The first member 21 or the second member 22 and the driven member 3 can be driven by gears, that is, the first member 21 or the second member 22 is provided with a gear, the driven member 3 is also provided with a gear, and the two are meshed by gears. In addition, the first member 21 or the second member 22 and the driven member 3 can also be driven by belts or chains, which will not be repeated herein. The torsion mechanism 4 can provide the torsion during rotation, so that the first lock accessory 11 is fixed at any angle with the second lock accessory 12. The torsion mechanism 4 is at least provided at the driven member 3, that is, the torsion mechanism 4 can be provided only at the driven member 3, or at both the driven member 3 and the first member 21, or at both the driven member 3 and the second member 22. When the torsion mechanism 4 is only provided at the driven member 3, diameter of the driven member 3 determines an amount of the torsion that the rotation shaft assembly can provide. Therefore, size of the rotation shaft 2 is irrelevant to the amount of the torsion and is no longer limited by the torsion, and the size of the rotation shaft 2 can be set freely according to requirements. When the torsion mechanism 4 is provided at the first member 21 or the second member 22 of the rotation shaft 2, torsion required for rotation of the electronic apparatus can be distributed to the rotation shaft 2 and the driven member 3. Since the amount of the torsion is related to sizes of the members, after the size of the rotation shaft 2 is set according to needs, size of the driven member 3 can be adjusted according to the required torsion of the electronic apparatus. In summary, the torsion provided by the rotation shaft assembly in the present disclosure is determined by the size of the driven member 3, so that the rotation shaft 2 with small size can still meet torsion requirements of the electronic apparatus. Therefore, in the present disclosure, the torsion mechanism is arranged at the driven member to meet needs of a user for the small rotation shaft. When the electronic apparatus is a notebook computer, the rotation shaft assembly in the present disclosure can be the upside rotation shaft 2. The driven member 3 is arranged inside a keyboard, and the rotation shaft 2 is arranged on a side of the keyboard facing a display screen. The size of the rotation shaft 2 can be made the same as thickness of the display screen of the notebook computer, and after that the size of the driven member 3 is designed according to required torsion of the notebook computer. Normally, thickness of the keyboard of the notebook computer is greater than the thickness of the screen, and the size of the driven member 3 is larger than the size of the rotation shaft 2, so that the driven member 3 is arranged inside the keyboard, and the rotation shaft 2 is arranged at the keyboard with the same thickness as the display screen, which have reasonable layout, and can make the notebook computer have a beautiful appearance.

Figure 2:
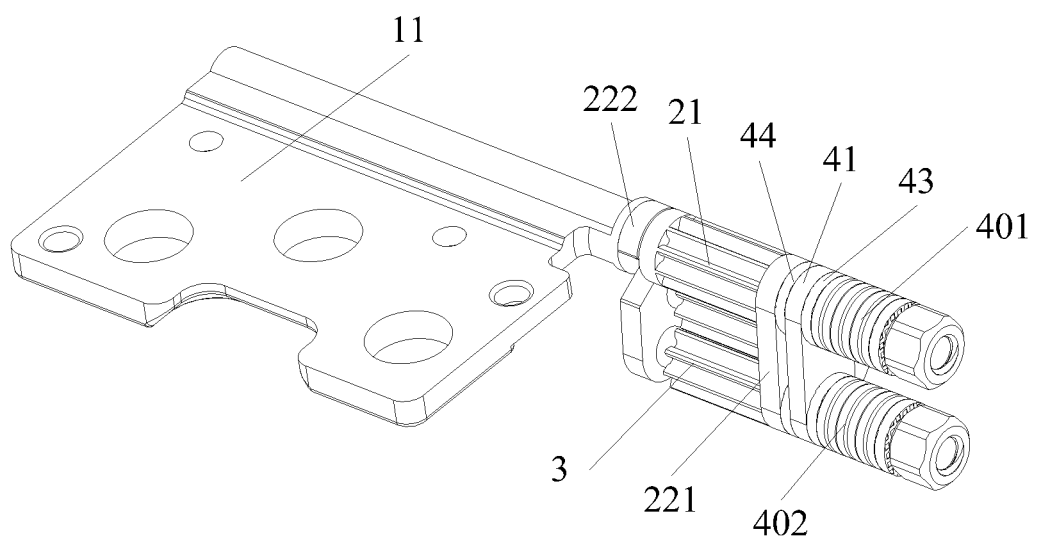
FIG. 2 is another schematic structural diagram of a rotation shaft assembly according to an embodiment of the present disclosure.

In some modified embodiments of the present disclosure, as shown in FIG. 2, the torsion mechanism 4 includes a first torsion mechanism 401 and a second torsion mechanism 402, where the first torsion mechanism 401 is arranged at the first member 21 or the second member 22, and the second torsion mechanism 402 is arranged at the driven member 3.

Both the rotation shaft 2 and the driven member 3 are provided with the torsion mechanism 4, and the required torsion of the electronic apparatus can be distributed to the rotation shaft 2 and the driven member 3, so that the size of the driven member 3 can be reduced compared with the scheme in which the torsion mechanism 4 is only provided at the driven member 3. When the rotation shaft assembly is mounted to the notebook computer, it can be avoided that the size of the driven member 3 exceeds the thickness of the keyboard due to a large size of the driven member 3, which affects the appearance of the notebook computer.

Figure 5:
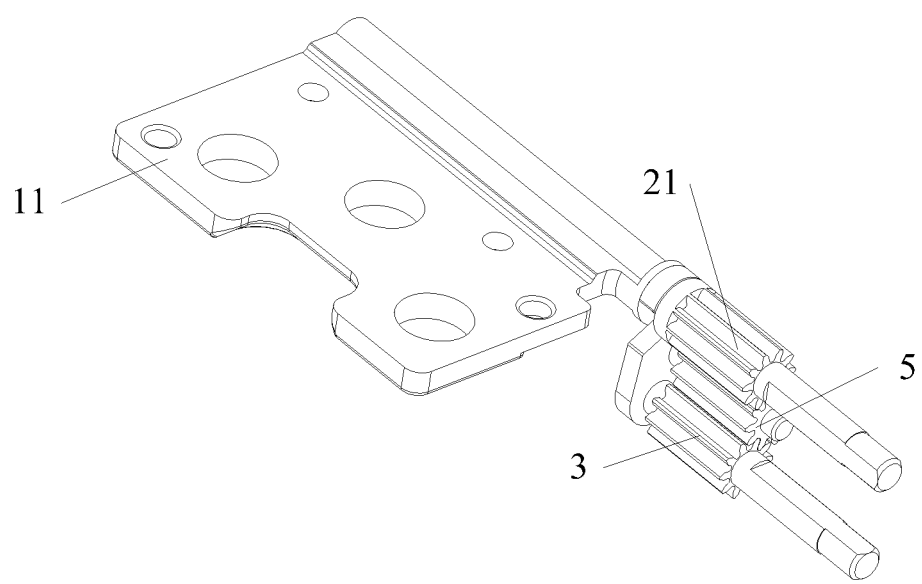
FIG. 5 is another schematic structural diagram of a rotation shaft assembly according to an embodiment of the present disclosure.

In some embodiments, as shown in FIGS. 1, 2, and 5, the rotation shaft assembly also includes a first transmission member 5, and the first member 21 or the second member 22 is connected to the driven member 3 through the first transmission member 5. The first member 21 and the second member 22 drive the first transmission member 5 to rotate, and rotation of the first transmission member 5 drives the driven member 3 to rotate.

In an example where the first torsion mechanism 401 is arranged at the first member 21, the first transmission member 5 is provided between the first member 21 and the driven member 3, and the first transmission member 5 can separate the first member 21 from the driven member 3, so as to avoid interference between the first torsion mechanism 401 arranged at the first member 21 and the second torsion mechanism 402 arranged at the driven member 3. In addition, in order to avoid the interference between the first torsion mechanism 401 and the second torsion mechanism 402, the first torsion mechanism 401 and the second torsion mechanism 4 can be arranged alternately, and the first transmission member 5 is not required in this case. The first member 21 or the second member 22 and the first transmission member 5 may be connected by a meshing engagement, and the first transmission member 5 and the driven member 3 may be connected by the meshing engagement.

In some embodiments, there are a plurality of driven members 3, and the plurality of driven members 3 are connected in sequence. The first member 21 or the second member 22 is connected to the driven member 3 located at an end of the plurality of driven members 3. There are a plurality of torsion mechanisms 4, and the plurality of torsion mechanisms 4 are respectively arranged at the plurality of driven members 3. The rotation shaft assembly also includes one or more second transmission members, and two adjacent driven members 3 are connected by one of the one or more second transmission members.

The first member 21 or the second member 22 is connected to the driven member 3 located at the end of the plurality of driven members 3. When the rotation shaft assembly is set in the notebook computer, the first member 21 or the second member 22 is connected to the display screen, and can be prevented from protruding from the driven member 3 in this case, which affects the appearance and use of the notebook computer. The rotation shaft assembly may include a plurality of driven members 3, and the plurality of driven members 3 are all provided with torsion mechanisms 4, so that the torsion is distributed to the plurality of driven members 3, which reduces the size of each driven member 3. When the rotation shaft assembly is provided with a plurality of driven members 3, the second transmission member may be provided between the two adjacent driven members 3, so that the second transmission member can separate the second torsion mechanisms 4 at the adjacent driven members 3, which avoids interference between the torsion mechanisms 4 at the two adjacent driven members 3 that affects rotation of the rotation shaft assembly.

Figure 3:
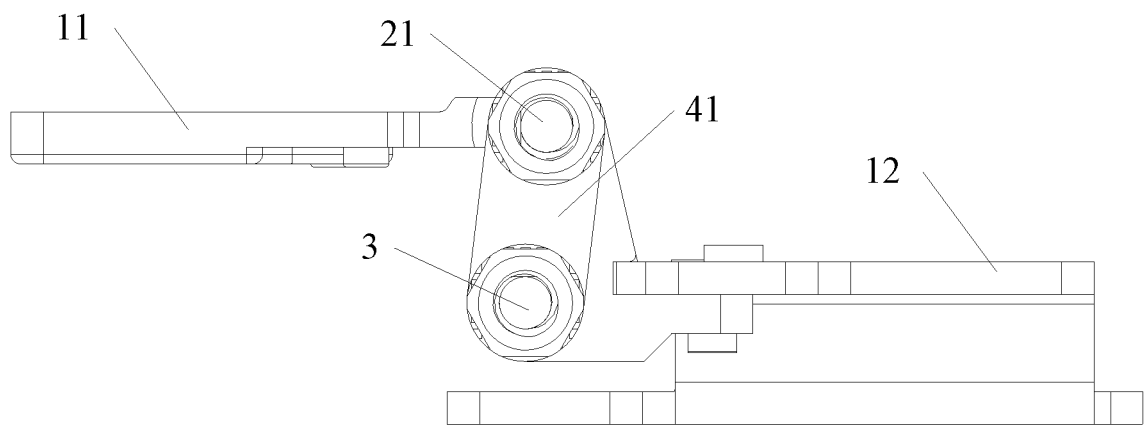
FIG. 3 is another schematic structural diagram of a rotation shaft assembly according to an embodiment of the present disclosure.

In some embodiments, as shown in FIGS. 1-3, the torsion mechanism 4 includes a fixation member 41 and a follower member 42. The fixation member 41 is movably sleeved at the driven member 3. The follower member 42 is fixedly arranged at the driven member 3 and abuts against the fixation member 41 to generate the torsion. The follower member 42 includes a lock member 421 and an elastic member 422, and the elastic member 422 abuts against the fixation member 41. The lock member 421 is arranged at an end of the elastic member 422 away from the fixation member 41, and is configured to compress the elastic member 422 so that the elastic member 422 is in a compressed state. The elastic member 422 includes a plurality of elastic washers 4221, and the plurality of elastic washers 4221 are connected in sequence. The elastic washer 4221 includes a first side surface and a second side surface opposite to each other, where the first side surface is recessed in a first direction and forms an elastic deformation space, and the second side surface is convex in the first direction. The first direction is from the first side surface towards the second side surface, and the first side surfaces of two adjacent elastic washers 4221 face two opposite directions.

As shown in FIG. 1, the torsion mechanism 4 includes the fixation member 41 and the follower member 42. The fixation member 41 is movably sleeved at the driven member 3, and does not rotate with rotation of the driven member 3. The follower member 42 is fixedly arranged at the driven member 3, and rotates with the rotation of the driven member 3. The follower member 42 abuts against the fixation member 41 to generate the torsion. Specifically, when the driven member 3 is driven by the first member 21 or the second member 22 to rotate, the fixation member 41 moves along with it, while the follower member 42 does not move. Therefore, relative movement can be generated between the follower member 42 and the fixation member 41, and a friction between the two can prevent the relative movement between the follower member 42 and the fixation member 41, which prevents the transmission members from continuing to rotate.

Specifically, as shown in FIG. 1, the follower member 42 includes the lock member 421 and the elastic member 422 that are both connected to the driven member 3. The lock member 421 is fixed to the driven member 3, so that the elastic member 422 can be in the compressed state. The compressed elastic member 422 can increase a pressure applied to the fixation member 41, which increases the friction between the follower member 42 and the fixation member 41, and increases the torsion. The elastic member 422 may be a spring or another elastic element, which is not limited herein.

Figure 8:
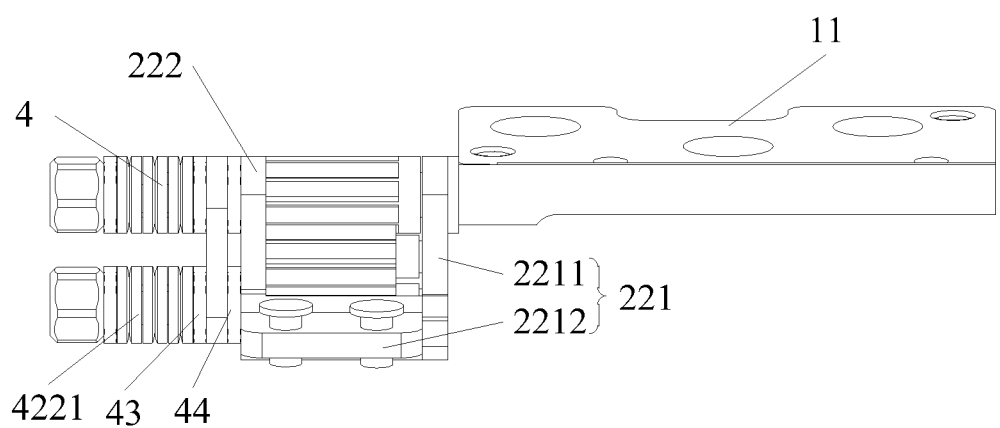
FIG. 8 is another schematic structural diagram of a rotation shaft assembly according to an embodiment of the present disclosure.

In addition, as shown in FIG. 8, the elastic member 422 includes a plurality of elastic washers 4221, and the lock member 421 can compress the plurality of elastic washers 4221, so that the elastic deformation space of the plurality of elastic washers 4221 is deformed, which causes the plurality of elastic members 422 are in the compressed state.

The torsion mechanism 4 is arranged at an end of the driven member 3 with a torsion zone, and the torsion zone includes a first end and a second end opposite to each other. The fixation member 41 is arranged at the first end, and the lock member 421 is arranged at the second end. The second end is provided with a thread, and the lock member 421 can be a nut that is threadedly connected to the second end. In addition, a cross section of the torsion zone between the first end and the second end is irregular. The elastic washer 4221 is provided with a mounting hole, and shape of the mounting hole matches shape of the torsion zone, so that the elastic washer 4221 can rotate with the driven member 3. The first torsion mechanism 401 and the second torsion mechanism 402 have the same structure as the torsion mechanism described above, and an end of the first member 21 or the second member 22 provided with the torsion mechanism 4 has the same structure as the end of the driven member 3 provided with the torsion mechanism 4, that is, the first member 21 or the second member 22 is also provided with a torsion zone, which will not be repeated herein.

Figure 6:
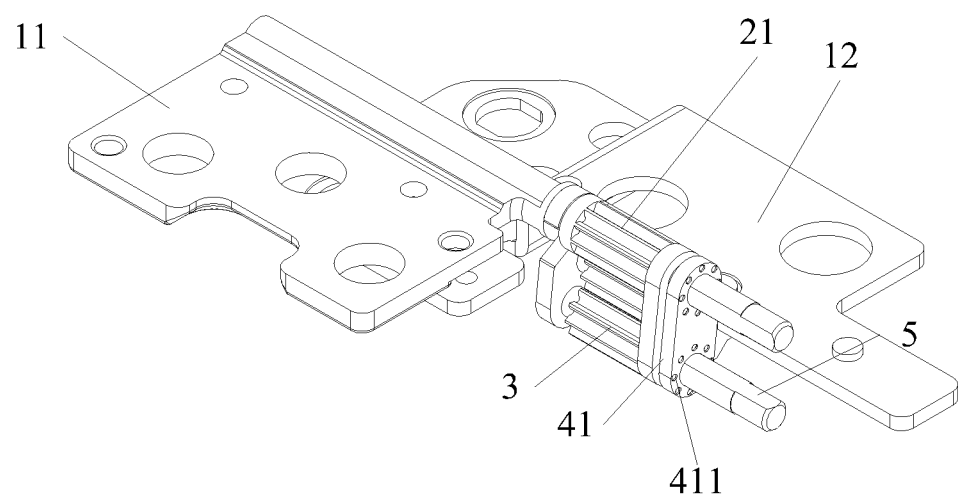
FIG. 6 is another schematic structural diagram of a rotation shaft assembly according to an embodiment of the present disclosure.

In some embodiments, as shown in FIG. 6, the fixation member 41 is provided with a first oil storage tank 411 at a side facing the follower member 42, and the follower member 42 is provided with a second oil storage tank at a side facing the fixation member 41. Both the first oil storage tank 411 and the second oil storage tank are configured to store wear-resistant fluid.

The follower member 42 and the fixation member 41 can rotate relative to each other, so the wear-resistant liquid stored in the follower member 42 and the fixation member 41 can avoid excessive wear between the follower member 42 and the fixation member 41. There are a plurality of first oil storage tanks 411 that are evenly distributed at the fixation member 41, and there are a plurality of second oil storage tank that are evenly distributed at the fixation member 41. The follower member 42 is provided with a first wear-resistant washer 43 at an end facing the fixation member 41. The first wear-resistant washer 43 abuts at the elastic washer 4221 at the end, and can rotate with the driven member 3.

In some embodiments, the first member 21 is configured to rotate around its axis. The first member 21 is mesh engaged with the driven member 3, and the second member 22 is movably sleeved at the first member 21.

Figure 4:
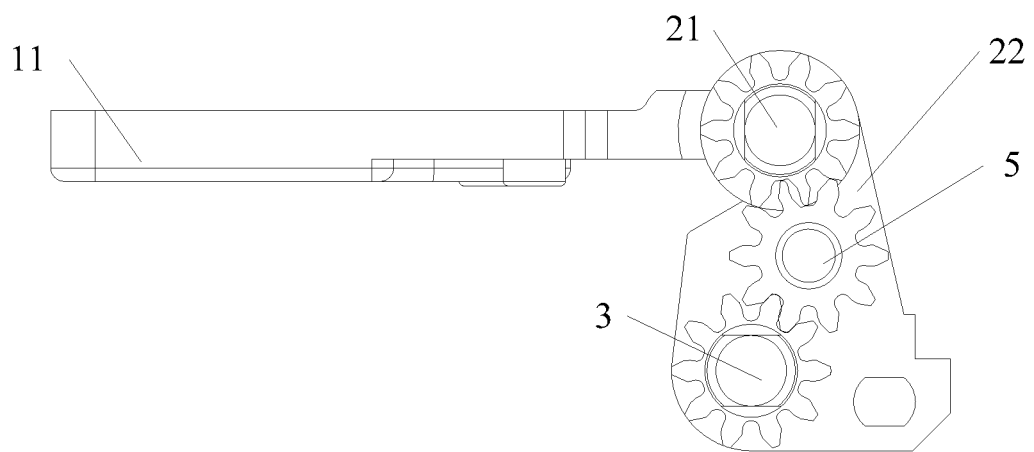
FIG. 4 is another schematic structural diagram of a rotation shaft assembly according to an embodiment of the present disclosure.

The second member 22 is sleeved at the first member 21. Specifically, the second member 22 is provided with that first movable hole, and the first member 21 is movably arranged in the first movable hole. The first member 21 is fixedly connected to the first lock accessary 11, and the second member 22 is fixedly connected to the second lock accessary 12, so the first lock accessary 11 can drive the first member 21 to rotate in the first movable hole of the second member 22 when the first lock accessary 11 rotates. The first member 21 can rotate around the axis of the first member 21 in the first movable hole, and the first member 21 and the driven member 3 can be connected by the meshing engagement. When the rotation shaft assembly is applied to the notebook computer, the first transmission member 5 may be arranged between the first member 21 and the driven member 3. As shown in FIG. 4, the axis of the first member 21, an axis of the driven member 3, and an axis of the first transmission member 5 are not in a straight line, so that a thickness of the rotation shaft assembly in a direction from the first member 21 towards to the driven member 3 can be reduced.

Figure 7:
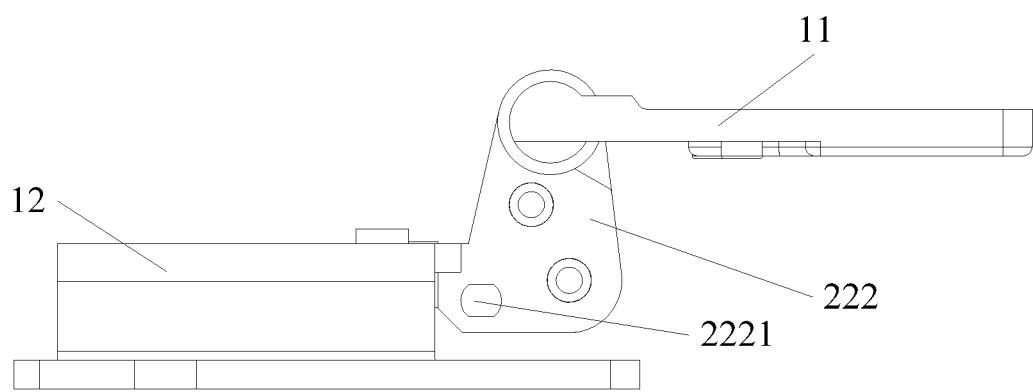
FIG. 7 is another schematic structural diagram of a rotation shaft assembly according to an embodiment of the present disclosure.

In some embodiments, as shown in FIGS. 1, 3, and 7, the second member 22 is also movably sleeved at the driven member 3, and the second member 22 includes a first bracket 221 and a second bracket 222. Both the first bracket 221 and the second bracket 222 are movably sleeved at the first member 21 and the driven member 3, and there is a preset distance between the first bracket 221 and the second bracket 222.

The second member 22 can also be movably sleeved at the driven member 3. Specifically, the second member 22 is also provided with a second movable hole, and the driven member 3 is movably arranged in the second movable hole and can rotate around the axis of the driven member 3, so the second member 22 can limit both the first member 21 and the driven member 3. In addition, in some embodiments, the second member 22 also includes the first bracket 221 and the second bracket 222, and both the first bracket 221 and the second bracket 222 are movably sleeved at the first member 21 and the driven member 3. Specifically, the first bracket 221 is provided with the first movable hole and the second movable hole, and the second bracket 222 is provided with a third movable hole and a fourth movable hole. The first member 21 passes through the third movable hole and the first movable hole in sequence, and the driven member 3 passes through the fourth movable hole and the second movable hole in sequence. The first bracket 221 and the second bracket 222 are set to limit the first member 21 and the driven member 3, so that misalignment of the first member 21 and the driven member 3 can be avoided during rotation. When the rotation shaft assembly also includes the first transmission member and/or the second transmission member, both ends of the first transmission member and/or the second transmission member can be rotatably connected to the first bracket 221 and the second bracket 222.

A second wear-resistant washer 44 is provided at a side of the first bracket 221 away from the second bracket 222, and the second wear-resistant washer 44 is fixedly connected to the driven member 3, that is, the second wear-resistant washer 44 can rotate with the driven member 3, or a relative rotation can be generated between the driven member 3 and the second wear-resistant washer 44. the fixation member 41 and the follower member 42 are sequentially arranged at a side of the second wear-resistant washer 44 away from the first bracket 221, and the second wear-resistant washer 44 is provided with a third oil storage tank at a side facing the fixation member 41. There are a plurality of third oil storage tanks that are evenly distributed at the second wear-resistant washer 44. The fixation member 41 is provided with a fourth oil storage tank at a side facing the second wear-resistant washer 44. There are a plurality of fourth oil storage tanks that are evenly distributed at the fixation member 41. The fourth oil storage tank and the first oil storage tank 411 are respectively arranged at opposite sides of the fixation member 41. The driven member 3 is provided with teeth, and the first bracket 221 and the second bracket 222 are respectively located at two ends of the teeth. Both the driven member 3 and the first member 21 are provided with the torsion mechanism 4, so that the fixation member 41 at the first member 21 can be connected to the fixation member 41 at the driven member 3, that is, there are two fixation members 41, which are sleeved at the first member 21 and the driven part 3 respectively. In addition, the two ends of the first transmission member 5 can be respectively rotatably connected to the first bracket 221 and the second bracket 222, so as to limit the first transmission member 5 and prevent the first transmission member 5 from detaching from the rotation shaft assembly. Teeth at the first member 21 are arranged between the first bracket 221 and the second bracket 222, and teeth at the first transmission member are arranged between the first bracket 221 and the second bracket 222.

In some embodiments, as shown in FIGS. 7 and 8, the first bracket 221 includes a support member 2211 and a connection member 2212. The support member 2211 is movably sleeved at the first member 21 and the driven member 3, and the connection member 2212 is connected to the support member 2211 and extends toward the second bracket 222. The connection member 2212 is provided with a first limiting member at an end facing the second bracket 222, and is connected to the first lock accessory 11. The second bracket 22 is provided with a second limiting member at an end facing the connection member 2212, and the first limiting member is butted with the second limiting member.

Figure 9:
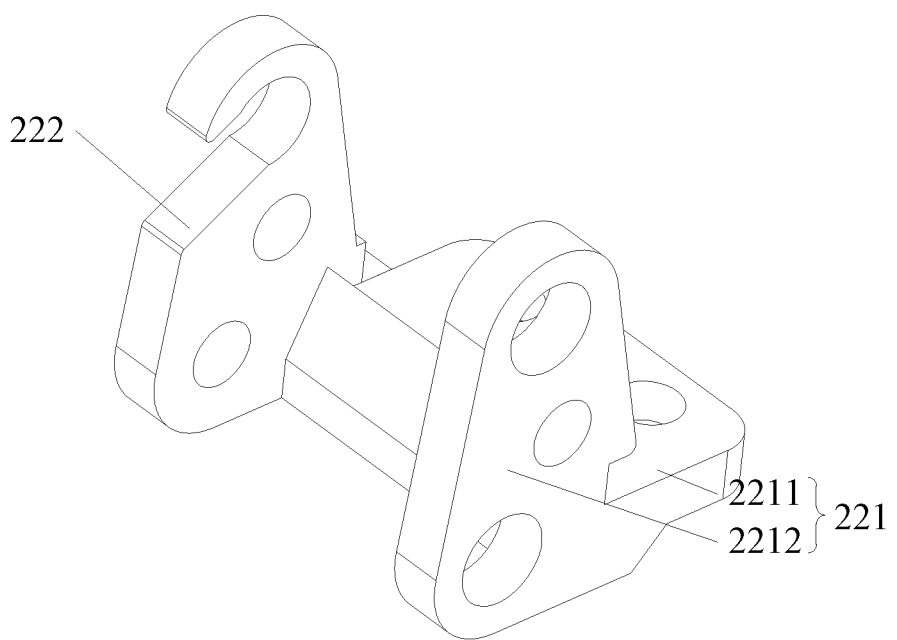
FIG. 9 is another schematic structural diagram of a rotation shaft assembly according to an embodiment of the present disclosure.

Both the first movable hole and the second movable hole are arranged at the first bracket 221, and the first bracket 221 is respectively sleeved at the first member 21 and the driven member 3 through the first movable hole and the second movable hole. The connection member 2212 is connected to the first lock accessory 11, and the connection member 2212 and the first lock accessory 11 may be detachably connected or integrally formed, which is not specifically limited herein. The first limiting member may be a limiting protrusion arranged at the first bracket 221, and the second limiting member may be a limiting hole 2221 arranged at the second bracket 222. The limiting protrusion matches the shape of the limiting hole 2221, and is located in the limiting hole 2221. In addition, as shown in FIG. 9, an mounting opening communicating with the third movable hole is provided at the second bracket 222, and the second bracket 222 can be sleeved at an outer surface of the first member 21 through the mounting opening, so that the first member 21 is located in the third movable hole. In addition, the first member 21 is provided with a first protrusion and a second protrusion at a circumferential side surface, and the second bracket 222 can be located between the first protrusion and the second protrusion, so that the first protrusion and the second protrusion can limit the second bracket 222 to prevent the second bracket 222 from moving. The first member 21 and the second bracket 222 are made of metal materials, so the second bracket 222 and the first member 21 can be welded in order to ensure fixation effect between the second bracket 222 and the first member 21. The first locking accessory 11 is connected to an end of the first member 21 away from the lock member.

The present disclosure also provides an electronic apparatus, which includes: a first body, a second body, and a rotation shaft assembly provided in any of the above embodiments. The first body is connected to the first lock accessary of the rotation shaft assembly, and the second body is connected to the second locking accessory of the rotation shaft assembly. The electronic apparatus have all the beneficial effects of the rotation shaft assembly provided by the above embodiments, and will not be repeated herein. In addition, the electronic apparatus has two states. In a first state, the first body and the second body are at a predetermined angle, and in a second state, the first body is buckled at a first side surface of the second body. An accommodation space is provided in the second body, and an opening communicating with the accommodation space is provided at the first side surface. The driven member 3 and/or the first transmission member 5 and/or the second transmission member of the rotation shaft assembly are arranged within the accommodation space, and the first member 21 of a rotation shaft passes through the opening and is exposed to the first side surface. The second body can be a keyboard of a notebook computer, and the second body can be a display screen of the notebook computer. Since the rotation shaft is located at a first side, it is not arranged at a back side of the keyboard. When a user uses the notebook computer, the first side faces away from a placement surface, and the back side is a side of the keyboard away from the user, so an air outlet can be provided at the back side of the keyboard to improve heat dissipation efficiency of the notebook computer and avoid the notebook computer from excessively high temperature due to insufficient heat dissipation, which improves user experience.

The above are only some specific embodiments of the present disclosure, but the scope of the present disclosure is not limited hereto. Any person skilled in the art can easily conceive various equivalent modifications or substitutions within the technical scope disclosed in the present disclosure, and these modifications or substitutions should be within the scope of the present disclosure. The protection scope of the present application should be subject to the protection scope of the claims.

What is claimed is:

1. A rotation shaft assembly comprising:
   a first lock accessory;
   a second lock accessory;
   a rotation shaft including a first member and a second member that are rotatable relative to each other, the first member being fixedly connected to the first lock accessory, and the second member being fixedly connected to the second lock accessory;
   a driven member connected to the first member or the second member, and configured to be driven to rotate by the first member or the second member; and
   a torsion mechanism at least provided at the driven member and configured to provide torsion during rotation.

2. The rotation shaft assembly of claim 1, wherein the torsion mechanism includes a first torsion mechanism and a second torsion mechanism, the first torsion mechanism being arranged at the first member or the second member, and the second torsion mechanism being arranged at the driven member.

3. The rotation shaft assembly of claim 1, further comprising:
   a transmission member;
   wherein the first member or the second member is connected to the driven member through the transmission member, the first member and the second member drive the transmission member to rotate, and rotation of the transmission member drives the driven member to rotate.

4. The rotation shaft assembly of claim 1, wherein:
   the driven member is one of a plurality of driven members of the rotation shaft assembly, the plurality of driven members being connected in sequence, and the first member or the second member being connected to the driven member located at an end of the plurality of driven members; and
   the torsion mechanism is one of a plurality of torsion mechanisms of the rotation shaft assembly, the plurality of torsion mechanisms being arranged at the plurality of driven members, respectively.

5. The rotation shaft assembly of claim 4, further comprising:
   one or more transmission members;
   wherein two adjacent ones of the driven members are connected to each other by one of the one or more transmission members.

6. The rotation shaft assembly of claim 1, wherein the torsion mechanism includes a fixation member and a follower member, the fixation member being movably sleeved at the driven member, and the follower member being fixedly arranged at the driven member and abutting against the fixation member to generate the torsion.

7. The rotation shaft assembly of claim 6, wherein the follower member includes a lock member and an elastic member, the elastic member abutting against the fixation member, and the lock member being arranged at an end of the elastic member away from the fixation member and configured to compress the elastic member so that the elastic member is in a compressed state.

8. The rotation shaft assembly of claim 7, wherein:
   the elastic member includes a plurality of elastic washers connected in sequence; and
   each of the elastic washers includes a first side surface and a second side surface opposite to each other, the first side surface being recessed in a first direction and forming an elastic deformation space, the second side surface being convex in the first direction, the first direction being from the first side surface towards the second side surface, and the first side surfaces of two adjacent elastic washers facing two opposite directions.

9. The rotation shaft assembly of claim 6, wherein:
   the fixation member is provided with a first oil storage tank at a side facing the follower member;
   the follower member is provided with a second oil storage tank at a side facing the fixation member; and
   the first oil storage tank and the second oil storage tank are configured to store wear-resistant fluid.

10. The rotation shaft assembly of claim 1, wherein:
    the first member is configured to rotate around an axis and is mesh engaged with the driven member; and
    the second member is movably sleeved at the first member.

11. The rotation shaft assembly of claim 10, wherein:
the second member is movably sleeved at the driven member; and
the second member includes a first bracket and a second bracket, the first bracket and the second bracket being movably sleeved at the first member and the driven member, and the first bracket being separated from the second bracket by a preset distance.

12. The rotation shaft assembly of claim 11, wherein:
the first bracket includes a support member and a connection member, the support member being movably sleeved at the first member and the driven member, the connection member being connected to the support member and extending toward the second bracket, the connection member being provided with a first limiting member at an end facing the second bracket, and the connection member being connected to the first lock accessory; and
the second bracket is provided with a second limiting member at an end facing the connection member, the first limiting member being butted with the second limiting member.

13. An electronic apparatus comprising:
a first body;
a second body; and
a rotation shaft assembly including:
    a first lock accessory connected to the first body;
    a second lock accessory connected to the second body;
    a rotation shaft including a first member and a second member that are rotatable relative to each other, the first member being fixedly connected to the first lock accessory, and the second member being fixedly connected to the second lock accessory;
    a driven member connected to the first member or the second member, and configured to be driven to rotate by the first member or the second member; and
    a torsion mechanism at least provided at the driven member and configured to provide torsion during rotation.

14. The electronic apparatus of claim 13, wherein the torsion mechanism includes a first torsion mechanism and a second torsion mechanism, the first torsion mechanism being arranged at the first member or the second member, and the second torsion mechanism being arranged at the driven member.

15. The electronic apparatus of claim 13, wherein:
the driven member is one of a plurality of driven members of the rotation shaft assembly, the plurality of driven members being connected in sequence, and the first member or the second member being connected to the driven member located at an end of the plurality of driven members; and
the torsion mechanism is one of a plurality of torsion mechanisms of the rotation shaft assembly, the plurality of torsion mechanisms being arranged at the plurality of driven members, respectively.

16. The electronic apparatus of claim 13, wherein the torsion mechanism includes a fixation member and a follower member, the fixation member being movably sleeved at the driven member, and the follower member being fixedly arranged at the driven member and abutting against the fixation member to generate the torsion.

17. The electronic apparatus of claim 16, wherein the follower member includes a lock member and an elastic member, the elastic member abutting against the fixation member, and the lock member being arranged at an end of the elastic member away from the fixation member and configured to compress the elastic member so that the elastic member is in a compressed state.

18. The electronic apparatus of claim 17, wherein:
the elastic member includes a plurality of elastic washers connected in sequence; and
each of the elastic washers includes a first side surface and a second side surface opposite to each other, the first side surface being recessed in a first direction and forming an elastic deformation space, the second side surface being convex in the first direction, the first direction being from the first side surface towards the second side surface, and the first side surfaces of two adjacent elastic washers facing two opposite directions.

19. The electronic apparatus of claim 16, wherein:
the fixation member is provided with a first oil storage tank at a side facing the follower member;
the follower member is provided with a second oil storage tank at a side facing the fixation member; and
the first oil storage tank and the second oil storage tank are configured to store wear-resistant fluid.

20. The electronic apparatus of claim 13, wherein:
the first member is configured to rotate around an axis and is mesh engaged with the driven member; and
the second member is movably sleeved at the first member.

* * * * *